US012276620B2

(12) United States Patent
Bayram et al.

(10) Patent No.: US 12,276,620 B2
(45) Date of Patent: Apr. 15, 2025

(54) ANTENNA-GRATING COUPLED SENSING SYSTEM FOR CLUTTER REDUCTION DURING EVALUATION OF A STATUS OF A MATERIAL

(71) Applicant: PANERATECH, INC., Chantilly, VA (US)

(72) Inventors: Yakup Bayram, Chantilly, VA (US); Alexander Ruege, Chantilly, VA (US)

(73) Assignee: PANERATECH, INC., Chantilly, VA (US)

( * ) Notice: Subject to any disclaimer, the term of this patent is extended or adjusted under 35 U.S.C. 154(b) by 166 days.

(21) Appl. No.: 18/003,930

(22) PCT Filed: Jun. 30, 2020

(86) PCT No.: PCT/US2020/040253
§ 371 (c)(1),
(2) Date: Dec. 30, 2022

(87) PCT Pub. No.: WO2022/005456
PCT Pub. Date: Jan. 6, 2022

(65) Prior Publication Data
US 2023/0268655 A1    Aug. 24, 2023

(51) Int. Cl.
*G01N 22/02* (2006.01)
*H01Q 13/02* (2006.01)

(52) U.S. Cl.
CPC .............. *G01N 22/02* (2013.01); *H01Q 13/02* (2013.01)

(58) Field of Classification Search
CPC .......... C03B 5/42; G01N 22/02; H01Q 1/528; H01Q 13/0266; H01Q 15/0053; H01Q 13/02; H01Q 5/335; H01Q 9/0485
See application file for complete search history.

(56) References Cited

U.S. PATENT DOCUMENTS

| 3,711,980 A | 1/1973 | Palama |
| 4,725,847 A | 2/1988 | Poirier |

(Continued)

FOREIGN PATENT DOCUMENTS

| EP | 3518342 | 7/2019 |
| JP | S5927604 | 2/1984 |

OTHER PUBLICATIONS

International Search Report issued in co-pending application No. PCT/US2020/040253 on Sep. 24, 2020.

(Continued)

*Primary Examiner* — Jay Patidar
(74) *Attorney, Agent, or Firm* — Whiteford, Taylor & Preston, LLP; Gregory M. Stone (57) ABSTRACT

Disclosed is a sensing system to evaluate and monitor the status of a material forming part of a refractory furnace, integrating an antenna and a grating structure that might be part of the furnace. The system is operative to identify flaws and measure the erosion profile and thickness of different materials, including refractory materials of an industrial furnace, using radiofrequency signals. The system is designed to integrate the antenna with a grating adjacent to an external furnace wall to improve the overall performance of the sensing system as compared to that of the antenna alone during an inspection of the furnace, even in regions of difficult access. Furthermore, the system comprises a mechanism to physically attach the antenna to the furnace grating or to modify the grating configuration around the antenna to improve the system performance for better estimating the remaining operational life and maintenance plan of the furnace.

13 Claims, 5 Drawing Sheets

(56) References Cited

U.S. PATENT DOCUMENTS

| | | | |
|---|---|---|---|
| 6,198,293 | B1 | 3/2001 | Woskov et al. |
| 9,255,794 | B2 | 2/2016 | Walton et al. |
| 10,054,367 | B2 | 8/2018 | Bayram et al. |
| 10,151,709 | B2 | 12/2018 | Bayram et al. |
| 2007/0169721 | A1 | 7/2007 | Weisenstein et al. |
| 2011/0170108 | A1 | 7/2011 | Degertekin |
| 2015/0054207 | A1 | 2/2015 | Stepanski |
| 2015/0276577 | A1* | 10/2015 | Ruege .................. G01N 22/02 324/71.2 |
| 2015/0320322 | A1 | 11/2015 | Shylo et al. |
| 2016/0061562 | A1 | 3/2016 | Braun |
| 2017/0059277 | A1 | 3/2017 | Justice |
| 2017/0234808 | A1 | 8/2017 | Ruege et al. |
| 2017/0288291 | A1 | 10/2017 | Arai et al. |

OTHER PUBLICATIONS

Sivaprakasam, Balamurugan, et al. "Design and Demonstration of a Radar Gauge for In-Situ Level Measurement in Furnace." IEEE Sensors Journal, IEEE, USA. vol. 18, No. 10, May 15, 2018. pp. 4081-4088.
Office Action issued in corresponding Japanese application No. 2022-581545 on Feb. 6, 2024.
Search Report issued in corresponding European application No. 20943016.4 on Mar. 4, 2024.

\* cited by examiner

ANTENNA-GRATING COUPLED SENSING SYSTEM FOR CLUTTER REDUCTION DURING EVALUATION OF A STATUS OF A MATERIAL

FIELD OF THE INVENTION

The present invention relates to systems for evaluating the status of a material. More particularly, the present invention relates to sensing systems for monitoring and determining the condition of refractory material using radiofrequency signals.

BACKGROUND OF THE INVENTION

A number of evaluation and monitoring systems have been disclosed within various industries for measuring the properties during and after formation of certain materials, using radiofrequency signals. The surface characteristics, internal homogeneity, thickness, and rate of erosion of a material are some of the important attributes that may require monitoring and evaluation.

On a bigger scale, some industries such as the glass, steel, and plastic industries use large furnaces to melt the raw material used for processing. These furnaces may reach a length equivalent to the height of a 20-story building. Thus, they are a key asset for manufacturers in terms of costs and operational functionality. In order to minimize the internal heat loss at high operating temperatures, these furnaces are constructed using refractory material, having very high melting temperatures and good insulation properties, to create a refractory melting chamber. However, the inner walls of the refractory chamber of the furnace will degrade during operation. The effects of this degradation include inner surface erosion, stress cracks, and refractory material diffusion into the molten material. On the other hand, as the refractory material degrade over time, the molten material may penetrate into the refractory material accelerating the degradation process and creating a high risk for molten material leakage through the refractory wall with potentially devastating consequences.

In particular, the use of microwave signals to measure the thickness of materials such as furnace walls have been addressed in the prior art, as described in U.S. Pat. No. 6,198,293 to Woskov et al. and U.S. Pat. No. 9,255,794 to Walton et al. However, these efforts have faced certain challenges and limitations. In particular, attempts made to determine furnace wall thickness on hot furnaces have been generally unsuccessful because of the large signal losses involved in evaluating the inner surface of refractory materials, especially at relatively high frequency bands. Likewise, at relatively low frequency bands signals still experience losses and are limited in terms of the bandwidth and resolution required by existing systems.

Moreover, in placing system components close to the surface of the refractory material to be evaluated, spurious signal reflections make it difficult to isolate the reflected signal of interest, thus further complicating the evaluation of the status of either the inner surface or the interior of such materials. A major challenge is that furnace walls become more electrically conductive as temperature increases. Therefore, signals going through a hot furnace wall experience significant losses making the detection of these signals very challenging. Additionally, in most cases the monitoring sensors require direct physical access to the refractory material under evaluation and are sensitive to the presence of certain objects nearby, especially those made of metallic material.

Additional efforts have been made to evaluate the status of a material, using electromagnetic waves, by reducing the losses and level of spurious signals involved in evaluating refractory materials, as described in U.S. Pat. No. 10,151,709 to Bayram et al., U.S. Pat. No. 9,880,110 to Ruege et al., and U.S. Pat. No. 10,054,367 to Bayram et al. However, these systems are primarily aimed to mitigate multiple reflection effects of the electromagnetic waves used for suppression of clutter associated with the received signal. In addition, these attempts have focused on standalone systems lacking integration with supporting structures added or to be added onto a furnace after years of operation, further requiring software for maximizing the extraction of information from the measured data, and facing challenges to access areas of difficult access, or impeding furnace sensing in an industrial environment. As a result, these systems are not able to monitor and evaluate a large asset, such as an industrial furnace, for optimizing its operational life, without the support of major modifications to either the furnace supporting structures or the monitoring systems themselves.

Currently, there is no well-established integrated system of deterministically and effectively measuring the rate of penetration of molten material into the surrounding refractory material to optimize both the operational life and the maintenance plan of the furnace for a vast number of furnaces having external supporting structures. Moreover, this number is expected to substantially increase since more supporting structures will be installed as furnaces age. As a result, manufacturers may experience either an unexpected leakage of molten material through the furnace wall or conservatively shut down the furnace for re-build to reduce the likelihood of any potential leakage, based on the manufacturer's experience of the expected lifetime of the furnace. The lifetime of a furnace is affected by a number of factors, including the operational age, the average temperature of operation, the heating and cooling temperature rates, the range of temperatures of operation, the number of cycles of operation, and the type and quality of the refractory material as well as the load and type of the molten material used in the furnace. Each of these factors is subject to uncertainties that make it difficult to create accurate estimates of the expected lifetime of a furnace.

In particular, the flow of molten material, such as molten glass, at high temperatures erodes and degrades the inner surface of the refractory material and creates a high risk for molten glass leakage through the refractory wall. A major leak of molten glass through the gaps and cracks in the furnace walls may require at least 30 days of production disruption before the furnace can be restored to operating mode because it needs to be cooled down, repaired, and fired up again. Furthermore, a leak of molten glass may cause significant damage to the equipment around the furnace and, most importantly, put at risk the health and life of workers. For these reasons, in most cases furnace overhauls are conducted at a substantially earlier time than needed. This leads to significant costs for manufacturers in terms of their initial investment and the reduced production capacity over the operational life of the furnace.

Another important issue is that the material used to build the refractory chamber of the furnace may have internal flaws not visible by surface inspection. This could translate into a shorter life of the furnace and pose serious risks during furnace operation. Accordingly, a common practice used by furnace operators to minimize the impact of a furnace breakdown and extend the operational life of the furnace is to build a grating structure to surround the external furnace walls. Typically this grating consists of a set of elements, such as plates or bars made of steel or a material having a relatively high electrical conductivity, which are disposed substantially parallel and perpendicular to form a grid.

Grating is used, especially on glass furnaces, to provide structural support not only to degrading refractory walls, but also to additional refractory installed in the furnace as a preventative or corrective maintenance measure. In addition, by absorbing and dissipating heat, grating contributes to cool down the refractory material. However, the grating spacing between adjacent elements can be as small as a few centimeters, which results in a difficulty to have a direct access, required by most sensors using radio frequency signals, to the furnace wall or an obstruction of the signals for sensors physically unable to fit within the grating spacing dimensions. Moreover, there is an opportunity to couple the sensor with the grating to potentially improve the sensing capabilities as compared to those of the sensor alone. Therefore, the effective integration of a sensor, such as an antenna, and an existing or to be installed grating surrounding the refractory material of a furnace is key to optimize both the operational life and the maintenance plan of the furnace.

Thus, there remains a need in the art for systems capable of remotely evaluating the status of such refractory materials, through measurements of propagating radio frequency signals that avoid the problems of prior art systems.

SUMMARY OF THE INVENTION

An improved sensing system to evaluate and monitor the status of a material forming part of a refractory furnace and integrating an antenna and a grating structure that might be part of the furnace, is disclosed herein. One or more aspects of exemplary embodiments provide advantages while avoiding disadvantages of the prior art. The system is operative to identify flaws and measure the erosion profile and thickness of different materials, including (by way of non-limiting example) refractory materials of an industrial furnace, using radiofrequency signals. The system is designed to integrate the antenna with a grating adjacent to an external furnace wall to improve the overall performance of the sensing system as compared to that of the antenna alone during an inspection of the furnace, even in regions of difficult access. Furthermore, the system comprises a mechanism to physically attach the antenna to the furnace grating or to modify the grating configuration around the antenna to improve the system performance for better estimating the remaining operational life and maintenance plan of the furnace.

The antenna-grating sensing system is used to transmit a radiofrequency signal into a surface of a material to be evaluated by disposing the antenna contiguous (i.e., in physical contact with) to that surface. The radiofrequency signal penetrates the material and reflects from remote discontinuities. Any voids, flaws, the presence of a different material inside of the material to be evaluated, and any interface of the material with air or other materials may represent a remote discontinuity. The reflected radiofrequency signal is received by the same or a separate antenna and then is processed and timed using as reference the transmitted signal or the signal reflected from the discontinuity between the antenna and the surface of the material to be evaluated.

Typically, the received signal includes undesired clutter. Where the magnitude of the clutter is below the magnitude of the signals reflected from remote discontinuities of the material, it is possible to determine the distance from such discontinuities to the surface of the material contiguous to the antenna. One or more evaluations over an area of the material provides the residual thickness of the material and the location of flaws inside the material at each evaluation to create an erosion profile of the remote surface of the material.

In the present invention, the antenna is electromagnetically coupled to the furnace grating, which is typically made of conductive material. As a result, the grating along with the antenna becomes part of the radiating structure increasing the effective aperture of the antenna-grating system as compared to that of the antenna alone. This translates into an effective higher antenna gain for the antenna-grating system. Moreover, the antenna-grating coupling effectively extends the antenna edges. Accordingly, the ringing signals produced by the impingement of the propagating electromagnetic waves on the antenna edges are both delayed and reduced in level. This translates into an easier process to filter undesired effects, reduced level of clutter, and an improved signal-to-clutter ratio of the received signal. As a result, the dynamic range of the signals handled by the system is increased and the system's capability of detecting lower signal levels is improved.

In addition, different attachment mechanisms might be incorporated into the antenna to physically connect the furnace grating to the antenna. Moreover, the grating surrounding the antenna might be reconfigured by adding or removing grating pieces to improve the performance of the antenna-grating sensing system. Therefore, by increasing the dynamic range and reducing the signal-to-clutter ratio of the received signal, the integrated antenna-grating sensing system improves the capabilities of determining the rate of penetration of molten material into the surrounding material. As a result, the system allows for an improved visualization of the presence of extraneous material within the material under evaluation, such that the penetration of molten material into the insulating material can be detected early.

Accordingly, the estimation of the remaining operational life of the furnace becomes more effective, which results in practically extending the life of the furnace. This allows more effective and accurate scheduling to optimize the costly processes of furnace repairs, decommissioning, or replacement along with a significant reduction of the level of risk of an operational break or leakage of molten material.

By integrating the antenna with the grating adjacent to a furnace wall into a sensing system, and thereby significantly increasing the quality of the data collected, which translates into a more effective evaluation, monitoring, diagnosing, or tracking of one or more conditions related to the operational health of a furnace, as compared to standard techniques, the system is able to improve the capabilities to identify and determine the location of flaws and optimize the maintenance scheduling of costly and potentially risky assets, such as an industrial furnace.

BRIEF DESCRIPTION OF THE DRAWINGS

The numerous advantages of the present invention may be better understood by those skilled in the art by reference to the accompanying drawings in which.

DETAILED DESCRIPTION OF THE INVENTION

The following description is of particular embodiments of the invention, set out to enable one to practice an implementation of the invention, and is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Figure 1:
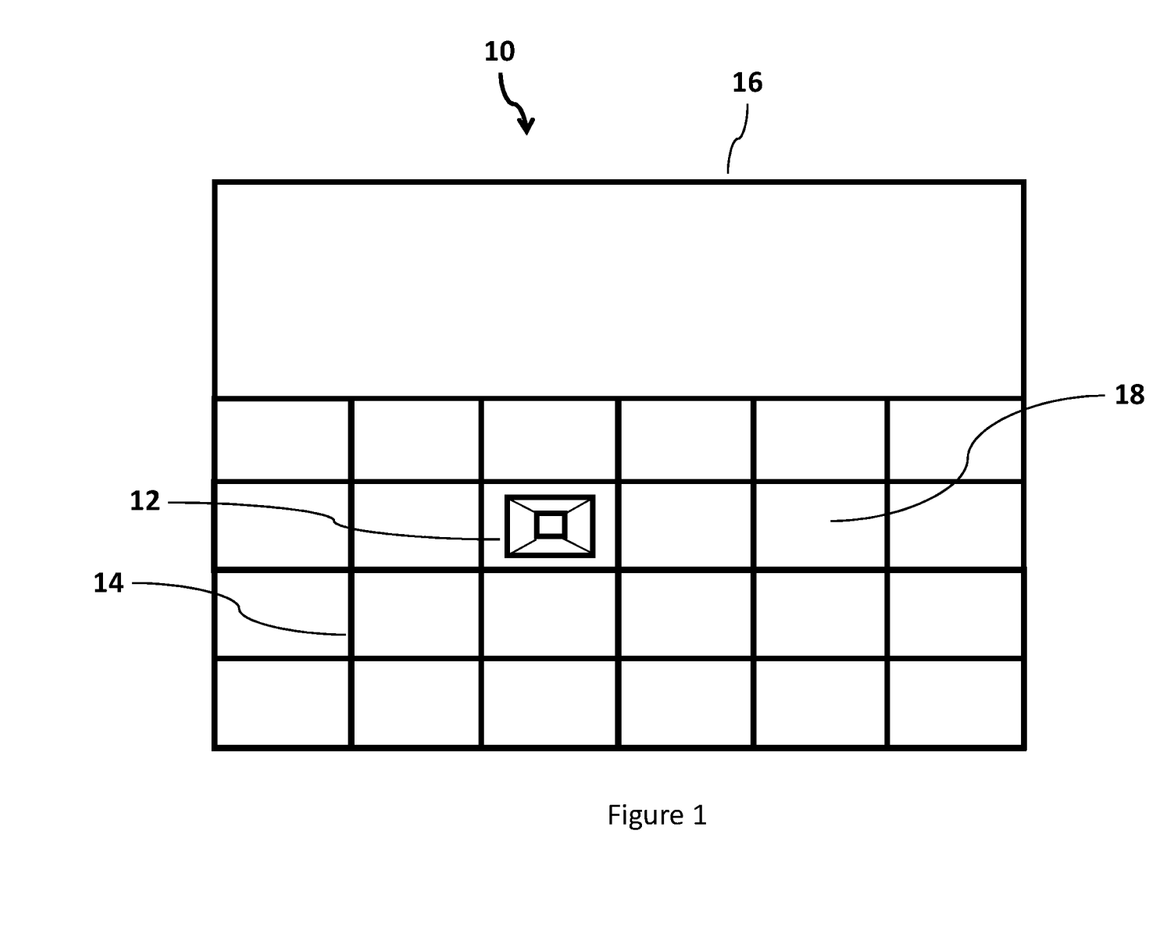
FIG. 1 shows a schematic front view of an antenna-grating sensing system used to evaluate and monitor the status of a unit under test in accordance with certain aspects of a configuration.

In accordance with certain aspects of a configuration of the invention, a schematic front view of an antenna-grating sensing system 10, used for a typical application of evaluating and monitoring or inspecting a unit under test (UUT) 16, is shown in FIG. 1. Antenna-grating sensing system 10 comprises an antenna 12, such as a pyramidal horn antenna with rectangular cross-section, and a grating 14. Antenna 12 is capable of transmitting one or more electromagnetic (EM) waves into a region around antenna 12 as well as receiving the corresponding one or more EM waves from that region within a frequency range, preferably in a frequency band of 0.25 GHz to 30 GHz.

Moreover, antenna 12 may transmit a plurality of EM waves in the frequency domain, such that the time domain representation of this plurality of EM waves corresponds to a radiofrequency (RF) signal of short duration, for example a Gaussian, Rayleigh, Hermitian, or Laplacian pulse or of the like or a combination thereof. Alternatively, antenna 12 may transmit such type of pulse, directly in time domain, as a Gaussian, Rayleigh, Hermitian, or Laplacian pulse or of the like or a combination thereof.

In this configuration, grating 14 consists of a set of elements, such as plates or bars made of a material having a relatively high electrical conductivity, such as steel, which are disposed substantially parallel and perpendicular to form a grid. More specifically the grating grid is uniform, as a result of the set of elements defining a number of rectangular (or square) cells, such as cell 18, having the same dimensions. The area of each cell, such as cell 18, is given by the distance between two adjacent parallel grating elements in a first dimension and the distance between two adjacent perpendicular grating elements in a second dimension.

Ideally grating 14 is contiguous to UUT 16 and provides structural support to UUT 16.

However, in practice small gaps of up to 10 mm can be observed due to warping of the grating or roughness on the wall. Furthermore UUT 16 preferably represents a furnace, the external refractory wall of a furnace, or a structure comprising multiple layers of refractory material, which is representative of applications used in the glass, steel, and plastic industries. In these applications, a chamber containing molten material is typically surrounded by multiple layers of material to prevent heat loss and leakage of molten material to the outside. In many cases UUT 16 is structurally supported by grating 14 as a further safety measure to workers and equipment operating in the surroundings of UUT 16.

Those skilled in the art will realize that grating 14 may consist of a non-uniform grid in which the cells have different dimensions. Alternatively, the set of elements of grating 14 may be disposed only parallel or only perpendicular no longer forming a grid, in which a cell is defined by the spacing between two adjacent elements in a first dimension and the size of the smaller of these two elements in a second dimension. Commonly, the separation between adjacent elements of grating 14 could be up to 100 millimeters or more.

Typically, antenna 12 is electrically connected to an RF transceiver, consisting of an RF transmitter and an RF receiver, and a control unit, comprising both a computer-based processor with an executable computer code or software thereon, capable of measuring and collecting data from the EM waves or RF signals received by antenna 12, and a data storage unit to store information pertinent to the data collected. During the inspection process, antenna 12 is disposed in the vicinity of, and preferably contiguous to UUT 16, such that, on the one hand, the signals transmitted by antenna 12 are launched into the region of UUT 16 to be inspected, whereas on the other hand, the signals transmitted by antenna 12 that are reflected by UUT 16 may be received by antenna 12.

In this particular configuration, antenna 12 is disposed within the area of a cell, such as cell 18, of grating 14. This allows antenna 12 to be placed contiguously to UUT 16. In addition, this prevents any element of grating 14 to interfere with the EM waves or RF signals transmitted or received by antenna 12 during operation. Moreover, antenna 12 is preferably disposed within a five percent of a wavelength, corresponding to the maximum frequency of the RF signal transmitted by antenna 12, from grating 14, such that antenna 12 properly couples electromagnetically to grating 14. However, most preferably, antenna 12 is in direct physical contact with grating 14.

A strong electromagnetic coupling between grating 14 and antenna 12 allows grating 14 to be part of a radiating structure along with antenna 12, which effectively increases the aperture and radiation gain of antenna-grating system 10, as compared to that of antenna 12 alone. Likewise, by coupling antenna 12 with grating 14 to form antenna-grating system 10, the size of antenna 12 is effectively extended beyond the actual physical edges of antenna 12. Accordingly, the ringing signals produced by EM waves propagating on the antenna edges are both delayed and reduced in level. This favors the filtering of undesired effects, reduces the received level of clutter, and improves the signal-to-clutter ratio of the received signal. As a result, the dynamic range of the signals handled by the system can be significantly increased, which may translate in an improved capability of detecting lower signal levels.

Thus, based on both the improved transmitted signals and the improved signals measured by the combination of antenna 12 and grating 14 to form antenna-grating system 10, an improved status of UUT 16 may be determined. With continued reference to FIG. 1, it is noted that components of the RF transceiver and the control unit have not been shown as these components are not critical to the explanation of this configuration.

Figure 2:
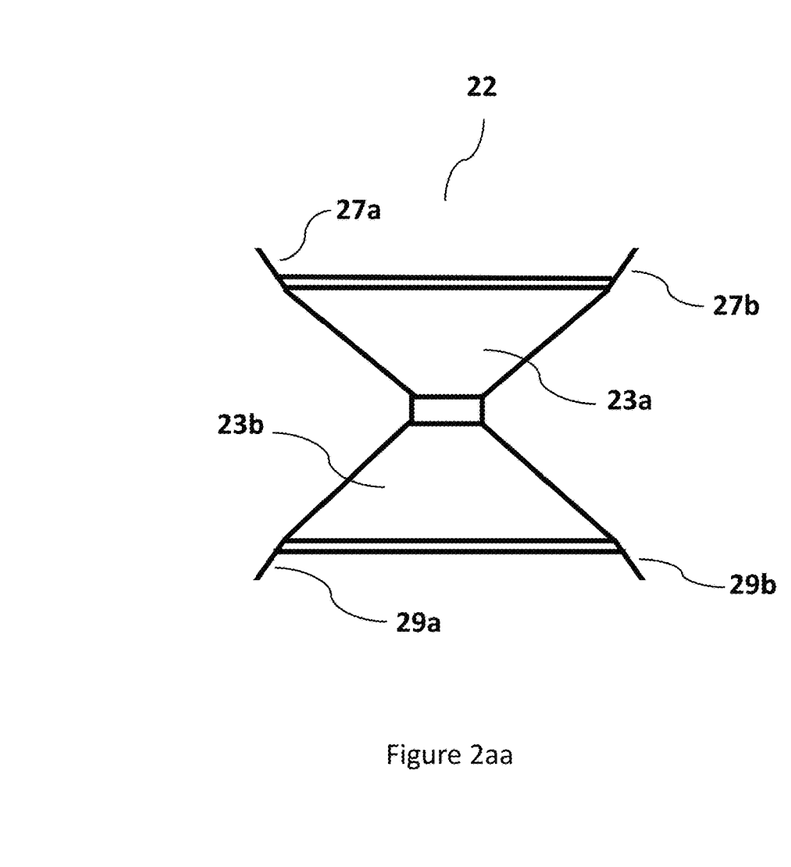
Figure 2A:
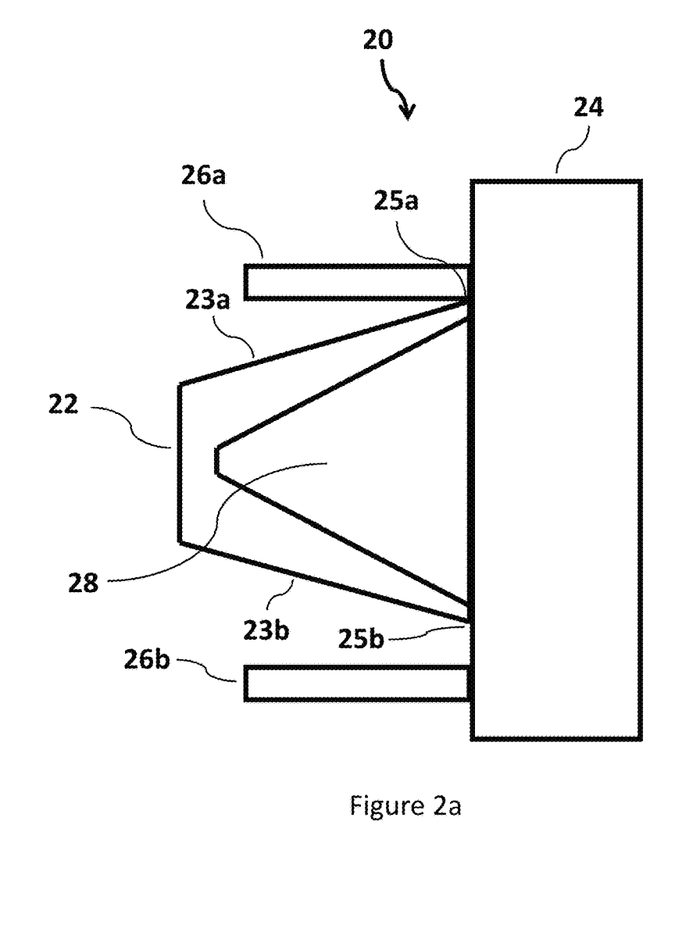
FIGS. 2a and 2aa show a schematic side view and a schematic front view, respectively, of an antenna-grating sensing system used to evaluate and monitor the status of a unit under test in accordance with certain aspects of another configuration, wherein one edge of the antenna physically couples directly to the grating.

FIGS. 2a and 2aa show a schematic side view and a schematic front view, respectively, of an antenna-grating sensing system 20, used to evaluate and monitor the status, such as a thickness or a flaw, of a UUT 24, in accordance with certain aspects of another configuration of the invention, comprising grating elements 26a and 26b and an antenna 22 disposed in between grating elements 26a and 26b, wherein grating element 26a is physically coupled directly to at least at one point of edge 25a of antenna 22.

Specifically, in FIGS. 2a and 2aa, antenna 22 consists of a pyramidal horn antenna having a rectangular cross-section. Antenna 22 comprises a first flared plate 23a having a planar section and two flared sections 27a and 27b along opposite side edges of such planar section of first flared plate 23a, and a second flared plate 23b positioned opposite first flared plate 23a, wherein second flared plate 23b comprises a planar section and two flared sections 29a and 29b along opposite side edges of such planar section of second flared plate 23b. First flared plate 23a further comprises a side edge 25a substantially perpendicular to the side edges of such planar section of first flared plate 23a. Likewise, flared plate 23b further comprises a side edge 25b substantially perpendicular to the side edges of such planar section of second flared plate 23b. Preferably the dimensions of first flared plate 23a and second flared plate 23b are identical. Moreover, the thickness of first flared plate 23a and/or the thickness of second flared plate 23b may be variable, and the thickness-to-length ratio of first flared plate 23a and/or second flared plate 23b is typically within the range of 15% to 85%.

More preferably, antenna 22 further comprises a material 28 disposed in at least a portion of a volumetric region, between first flared plate 23a and second flared plate 23b, which extends beyond the two flared sections 27a and 27b along the opposite side edges of first flared plate 23a and the two flared sections 29a and 29b along the opposite side edges of second flared plate 23b. Most preferably, under normal operating conditions, the impedance of material 28, which comprises a solid ceramic filling, substantially matches the impedance of UUT 24, which comprises refractory material, to smooth out the media discontinuity between material 28 and UUT 24. This may be predetermined by measuring the dielectric properties of the refractory material at various temperatures using methods well known in the prior art. Alternatively, the manufacturer of the refractory material may provide data about the dielectric properties of the material at different temperatures. These data can be used to determine the impedance of the material.

The impedance of the refractory material is primarily determined by both a relative dielectric permittivity of the material and a tangent loss of the material. Typically, the relative dielectric permittivity may range from 1 to 25 depending on the specific type of material and temperature of the material. Thus, material 28 may be selected to have a similar relative dielectric permittivity to that of the refractory material to substantially match the impedance of the refractory material. The state of matter of material 28 may be air, liquid, or solid. Preferably the filling material is a mixture of solid powder or granulated material in which the maximum dimension of each grain is desired to be no larger than five percent of a wavelength, corresponding to the maximum frequency of operation. More preferably, material 28 is a solid ceramic piece of material or the like. Alternatively, material 28 may be layered, such that a layer has a slightly different dielectric permittivity to the dielectric permittivity of the filling material of any adjacent layer to structure multiple layers of different dielectric permittivity in an arrangement that gradually adjust to the impedance of the refractory material of UUT 24.

Whenever necessary a lid or cap may be placed at edges 25a and 25b of antenna 22 to support, protect, and prevent material 28 from displacing within antenna 22 during manipulation or operation of antenna 22. Those skilled in the art will realize that a cap placed at edges 25a and 25b of antenna 22 must be made of a material having similar dielectric characteristics as those as material 28 to prevent a substantial impedance mismatch between the cap and material 28.

Furthermore, and still in reference to FIG. 2a, antenna 22 is preferably disposed contiguous to UUT 24 and in between two adjacent grating elements 26a and 26b. More preferably antenna 22 is physically coupled directly to one point of grating element 26a. Most preferably, edge 25a of antenna 22 is in physical contact with grating element 26a.

Figure 2B:
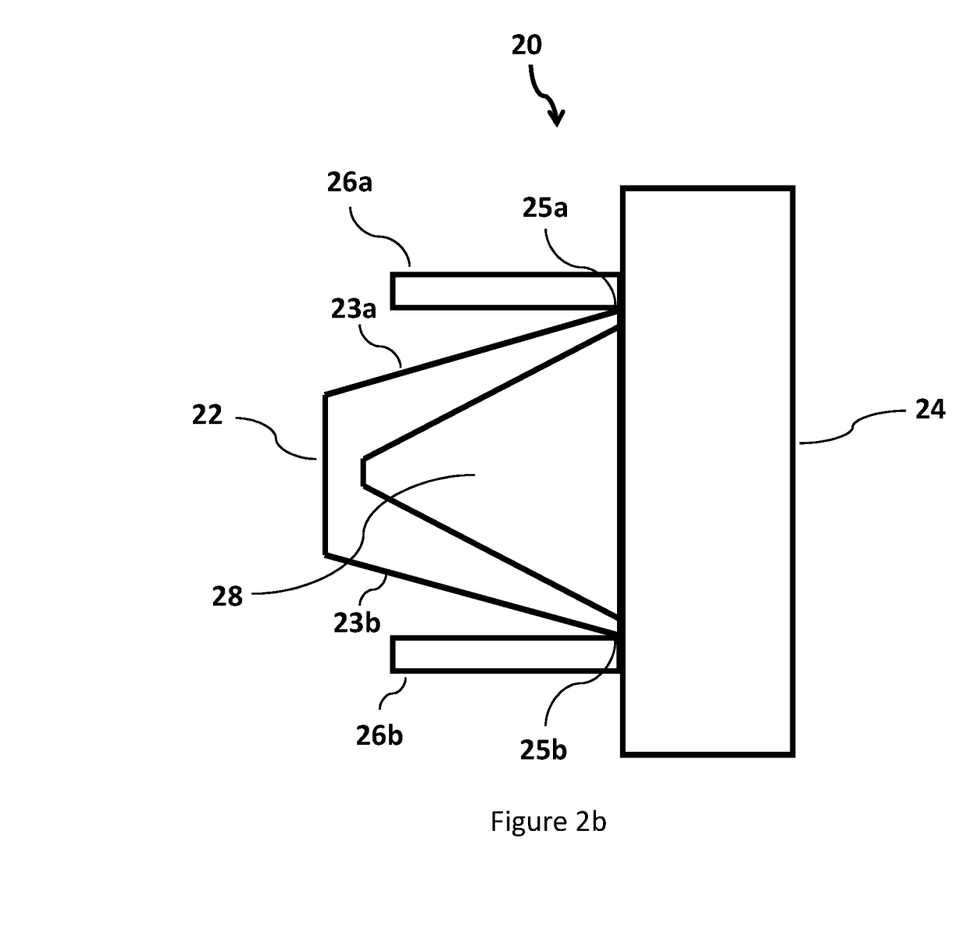
FIG. 2b shows a schematic side view of an antenna-grating sensing system used to evaluate and monitor the status of a unit under test in accordance with certain aspects of another configuration, wherein two edges of the antenna physically couple directly to the grating.

FIG. 2b shows a schematic side view of antenna-grating sensing system 20, used to evaluate and monitor the status, such as a thickness or a flaw, of UUT 24, in accordance with certain aspects of yet another configuration of the invention, comprising grating elements 26a and 26b and antenna 22 disposed in between grating elements 26a and 26b, wherein grating elements 26a and 26b are physically coupled directly to at least at one point of edges 25a and 25b of antenna 22, respectively. Furthermore, antenna 22 is preferably disposed contiguous to UUT 24 and in between two adjacent grating elements 26a and 26b. More preferably, edges 25a and 25b of antenna 22 are in physical contact with grating elements 26a and 26b, respectively.

In reference to FIGS. 2a and 2b configuration, adjacent grating elements 26a and 26b define a grating cell with a size given by the spacing between grating elements 26a and 26b in a first dimension and the length of the smaller of the two grating elements 26a and 26b in a second dimension.

Figure 3:
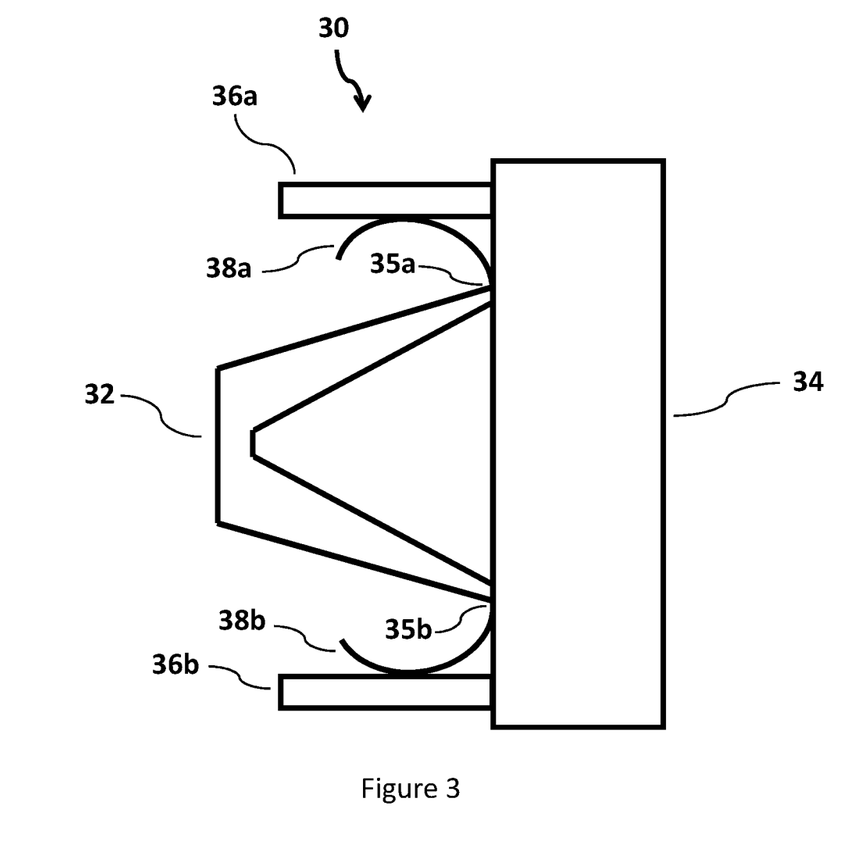
FIG. 3 shows a schematic side view of an antenna-grating sensing system used to evaluate and monitor the status of a unit under test in accordance with certain aspects of another configuration, wherein two edges of the antenna physically couple through a coupling mechanism to the grating.

In yet another configuration, FIG. 3 shows a schematic side view of antenna-grating sensing system 30, used to evaluate and monitor the status, such as a thickness or a flaw, of UUT 34. Antenna-grating sensing system 30 comprises grating elements 36a and 36b, antenna 32, disposed in between grating elements 36a and 36b, and coupling mechanisms 38a and 38b. Particularly, in this configuration, edge 35a of antenna 32 is physically coupled directly, through coupling mechanism 38a, to grating element 36a. Likewise, edge 35b of antenna 32 is physically coupled directly, through coupling mechanism 38b, to grating element 36b.

Furthermore, antenna 32 is preferably disposed contiguous to UUT 34 and in between two adjacent grating elements 36a and 36b. More preferably, coupling mechanisms 38a, 38b are made of an electrically conductive material and are in physical contact with edges 35a, 35b of antenna 32, respectively. Most preferably, coupling mechanism 38a is mechanically attached to antenna 32 to both physically and electrically couple along edge 35a of antenna 32. Likewise, coupling mechanism 38b is most preferably mechanically attached to antenna 32 to both physically and electrically couple along edge 35b of antenna 32.

Accordingly, and still in reference to FIG. 3, coupling mechanisms 38a, 38b extend the physical size of antenna 32 at edges 35a, 35b, respectively. Preferably, coupling mechanisms 38a, 38b comprise a curved flange made of a flexible and electrically conductive material having a first end, which attaches to edges 35a, 35b of antenna 32, and a second end, which extends back and away from edges 35a, 35b of antenna 32. More preferably, coupling mechanisms 38a, 38b attach to antenna 32 using a hinge or the like bolted to edges 35a, 35b of antenna 32. Most preferably, coupling mechanisms 38a, 38b partly bend, over a range of motion, back and away from edges 35a, 35b of antenna 32, to physically couple to grating elements 36a, 36b, which might be located at a variable distance from edges 35a, 35b of antenna 32. Moreover, coupling mechanisms 38a, 38b offer physical resistance while bending to physically couple more effectively to grating elements 36a, 36b. Typically, the gap between edges 35a, 35b of antenna 32 and grating elements 36a, 36b may vary from a few millimeters to 30 millimeters. Therefore the size of the flange comprising coupling mechanisms 38a, 38b is preferred to be in the order of 10 to 35 millimeters, although flanges having larger or smaller dimensions may be used too.

Those skilled in the art will realize that other types of coupling mechanisms in addition to a flexible flange, such as a rigid flange or a plate and at least one mechanical spring, and secure mechanical attachments, including fasteners, screws, adhesive, welding, nails, hooks, or the like, or combinations thereof might be implemented to mechanically attach the coupling mechanisms to the antenna. Likewise, different types of antennas other than a horn antenna and/or having or not smooth rolled edges may be used in the above-described antenna-grating sensing systems. More specifically, horn antennas having four flared plates; non-pyramidal horn antennas, such as conical or the like; or horn antennas with non-rectangular cross-section, such as an elliptical cross-section, may be used. Likewise uniform or non-uniform grating cell sizes with rectangular or non-rectangular cells may be used as part of above-described antenna-grating sensing systems.

Figure 4:
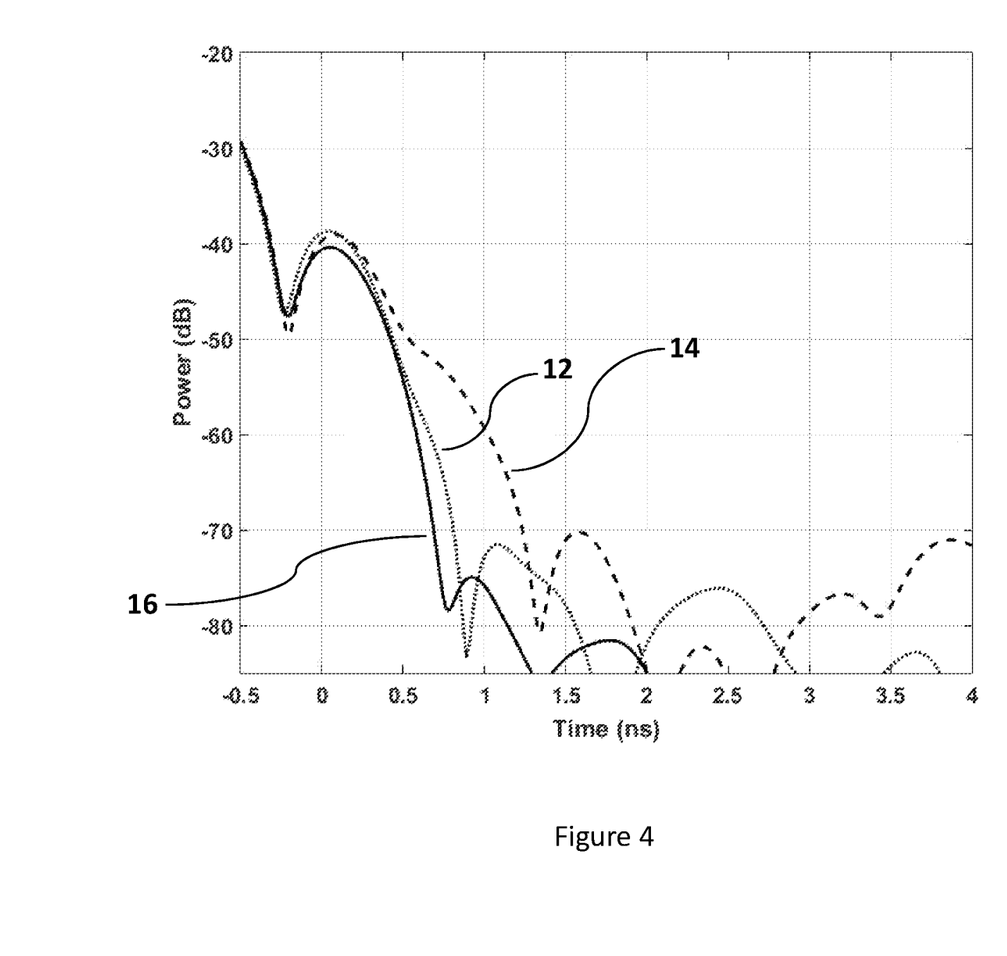
FIG. 4 shows a graph of the measured power level of clutter plus noise as a function of time, corresponding to an evaluation of a refractory material installed on an operating furnace under different scenarios.

FIG. 4 shows a graph of measurement data corresponding to a refractory material installed on an operating furnace, using an antenna such as the one described above in reference to FIGS. 2a and 2b. In this case, the refractory material was selected to be free of flaws and be thick enough so that there are no reflected signals from flaws and the reflected signals from any remote media discontinuity are significantly attenuated. Thus, FIG. 4 shows the measured power level of clutter plus noise as a function of time under different scenarios.

In reference to FIG. 4, a dotted-line curve 12 represents the measured power level of clutter plus noise as a function of time in the absence of grating next to the refractory material under test. On the other hand, a dashed-line curve 14 represents the measured power level of clutter plus noise as a function of time in the presence of a grating disposed next to the refractory material under test, but physically separated from the antenna, such that the antenna does not effectively couple to the grating. Finally, a solid-line curve 16 represents the measured power level of clutter plus noise as a function of time in the presence of a grating disposed next to the refractory material under test, wherein one edge of the antenna is directly in physical contact with the grating, such that the antenna does properly couple to the grating.

In FIG. 4, the reference time equal to zero corresponds to the contact position between the antenna and the refractory material. Accordingly, the time slot of interest for detecting a reflected signal of interest would be from the zero time reference to approximately two nanoseconds, which corresponds to the evaluation of a 10-cm thick refractory material or equivalent, having a value of nine as relative dielectric permittivity. As can be seen in FIG. 4, the measured power level of clutter plus noise corresponding to curve 14 (presence of grating uncoupled to antenna) is substantially larger (up to more than 20 dB) compared to that of curve 12 (absence of grating), within the area of interest. This means that the mere presence of grating not only is not enough to improve, but also may degrade the antenna-grating sensing system performance. Conversely, the measured power level of clutter plus noise corresponding to curve 16 (presence of grating coupled to antenna) is up to more than 10 dB lower as compared to that of curve 12 (absence of grating), within the area of interest. This means that by properly coupling the grating and the antenna by physically coupling at least one edge of the antenna to the grating, a substantial improvement of the antenna-grating system performance may be achieved, as compared to that of the antenna alone (in absence of grating).

Moreover, because the system noise is substantially similar both in the presence or absence of grating, the reductions in clutter plus noise levels observed in FIG. 4 correspond primarily to reductions in clutter levels. Thus, according to the measured data, the antenna-grating sensing system as described is capable of reducing the clutter by more than 10 dB. Therefore, even if there is no grating system installed in place in a furnace or a similar asset, implementing an antenna-grating system only for improving the monitoring, evaluation, maintenance, and/or life optimization of such asset might be significantly beneficial for the asset operator.

Those skilled in the art will realize that a plurality of antennas of the same type in either a monostatic or multistatic configuration as well as other types may be used. Moreover, one or more antennas may be permanently or temporarily installed in-situ in various locations and being electromagnetically coupled to a grating structure, especially in areas of difficult access. In some instances, preferably, these antennas may be installed during furnace construction or during a repair process. Furthermore the analysis of the data collected by the antenna-grating system may include the use of both data and image processing algorithms using one or more than one technique. These techniques may include Fourier transform, spectral analysis, frequency- and time-domain response analyses, digital filtering, convolution and correlation, decimation and interpolation, adaptive signal processing, waveform analysis, and data windows and phase unwrapping for data processing; and time domain, back projection, delay and sum, synthetic aperture radar imaging, back propagation, inverse scattering, and super-resolution, either with or without the application of differential imaging, for image processing.

The various embodiments have been described herein in an illustrative manner, and it is to be understood that the terminology used is intended to be in the nature of words of description rather than of limitation. Any embodiment herein disclosed may include one or more aspects of the other embodiments. The exemplary embodiments were described to explain some of the principles of the present invention so that others skilled in the art may practice the invention. Obviously, many modifications and variations of the invention are possible in light of the above teachings. The present invention may be practiced otherwise than as specifically described herein within the scope of the appended claims and their legal equivalents.

We claim:

1. A sensing system for evaluating a status of a material, comprising:

a. an antenna configured to transmit a first radiofrequency signal, onto a surface of said material to be evaluated, and to receive a second radiofrequency signal received from said surface of said material to be evaluated, wherein said antenna has an impedance at a closest point to said material that substantially matches an impedance of said surface of said material to be evaluated, and wherein said antenna is placed contiguously to said surface of said material;
b. a grating structure comprising a plurality of elements electrically conductive at a frequency of operation of said first radiofrequency signal and at a frequency of operation of said second radiofrequency signal, wherein at least two of said plurality of elements are disposed substantially parallel to each other next to said surface of said material to be evaluated;
c. a coupling mechanism to couple said antenna to said at least one of said elements of said grating;
wherein said antenna and at least one of said elements of said grating are properly coupled to reduce a plurality of signal reflections and a plurality of signal ringing of said first radiofrequency signal and said second radiofrequency signal to reduce a level of clutter otherwise present in said antenna by at least 10 dB, by coupling said at least one of said elements of said grating to at least a part of said antenna in a manner selected from a group consisting of physically and by placing said antenna within less than five percent of a wavelength, corresponding to a maximum frequency of said first radiofrequency signal, from said at least one of said elements of said grating, and wherein said coupling mechanism couples, over a range of motion, said antenna to said at least one of said elements of said grating over a range of spacing gaps between said antenna and said at least one of said elements of said grating.

2. The system of claim 1, wherein said material to be evaluated is a refractory material.

3. The system of claim 1, wherein a volumetric region within said antenna comprises a dielectric material.

4. The system of claim 1, wherein said antenna comprises a pyramidal horn antenna having a rectangular cross-section further comprising a first flared plate having a planar section and two flared sections along opposite side edges of said planar section of said first flared plate, and a second flared plate positioned opposite said first flared plate, said second flared plate comprising a planar section and two flared sections along opposite side edges of said planar section of said second flared plate.

5. The system of claim 4, wherein a thickness of at least one of said first flared plate and said second flared plate is variable.

6. The system of claim 4, wherein a thickness-to-length ratio of at least one of said first flared plate and said second flared plate is within the range of 15% to 85%.

7. The system of claim 4, wherein at least a portion of a volumetric region, between said first flared plate and said second flared plate, comprises a dielectric material, which extends beyond said two flared sections along said opposite side edges of said planar section of at least one of said first flared plate and said second flared plate.

8. The system of claim 1, wherein said grating structure is part of a furnace.

9. The system of claim 1, wherein said plurality of elements of said grating structure are uniformly spaced in at least one dimension.

10. The system of claim 1, wherein said coupling mechanism comprises a flange mechanically attached to said antenna by means of a secure mechanical attachment.

11. The system of claim 1, wherein said status of said material to be evaluated is selected from the group of a thickness of said material, a flaw of said material, and a level of penetration of a molten material into said material to be evaluated.

12. The system of claim 1, wherein said coupling mechanism couples to at least one edge of said antenna and is physically conformed to extend away from said edge of said antenna to physically couple to at least one of said elements of said grating structure.

13. The system of claim 1, wherein said first radiofrequency signal is selected from the group of a Gaussian pulse, a Rayleigh pulse, a Hermitian pulse, a Laplacian pulse, and a combination thereof.

* * * * *